(12) United States Patent
Kawaguchi

(10) Patent No.: US 8,904,605 B2
(45) Date of Patent: Dec. 9, 2014

(54) CORD LOCK

(75) Inventor: Gaku Kawaguchi, Yokohama (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 13/701,368

(22) PCT Filed: May 31, 2011

(86) PCT No.: PCT/JP2011/062490
§ 371 (c)(1),
(2), (4) Date: Dec. 20, 2012

(87) PCT Pub. No.: WO2011/152399
PCT Pub. Date: Dec. 8, 2011

(65) Prior Publication Data
US 2013/0104346 A1 May 2, 2013

(30) Foreign Application Priority Data

Jun. 2, 2010 (JP) .................................. 2010-127191

(51) Int. Cl.
*F16G 11/03* (2006.01)
*F16G 11/10* (2006.01)

(52) U.S. Cl.
CPC .............. *F16G 11/03* (2013.01); *F16G 11/101* (2013.01)
USPC .......................... 24/115 G; 24/712.5; D8/383

(58) Field of Classification Search
USPC ........... 24/115 G, 122.6, 136 R, 712.1, 712.2, 24/712.5, 713.6
See application file for complete search history.

(56) References Cited

U.S. PATENT DOCUMENTS

| 4,839,946 | A |   | 6/1989  | Murai  |           |
|-----------|---|---|---------|--------|-----------|
| 5,224,245 | A | * | 7/1993  | Matoba | ... 24/115 G |
| 5,263,232 | A | * | 11/1993 | Matoba | ... 24/115 G |

(Continued)

FOREIGN PATENT DOCUMENTS

| DE | 35 35 623 A1 | 4/1987  |
| JP | S63-175911   | 11/1988 |

(Continued)

OTHER PUBLICATIONS

PCT, "International Search Report for PCT/JP2011/062490", Aug. 9, 2011.

(Continued)

*Primary Examiner* — Robert J Sandy
*Assistant Examiner* — Rowland Do
(74) *Attorney, Agent, or Firm* — Manabu Kanesaka

(57) ABSTRACT

A cord lock includes a male tool and a female tool that receives a part of the male tool by pressing the male tool against a biasing force of a biasing device, and so as to match cord eyelets formed in sides of the male tool and the female tool each other at a predetermined pressing position of the male tool. An engaging part that is engaged with an engaged part of the female tool by the biasing force of the biasing device to prevent the male tool from slipping out of a position before the pressing operation, is formed on a side of the male tool intersecting a direction in which the eyelet passes through, and at a position closer to a pressing backward side than a hole edge located on a pressing forward side of the eyelet.

5 Claims, 8 Drawing Sheets

(56) References Cited

U.S. PATENT DOCUMENTS

| | | | |
|---|---|---|---|
| 5,323,514 A * | 6/1994 | Masuda et al. | 24/115 G |
| 5,345,657 A * | 9/1994 | Shimizu | 24/115 G |
| 5,379,496 A * | 1/1995 | Krauss | 24/625 |
| 5,649,340 A * | 7/1997 | Ida | 24/115 G |
| 5,666,699 A * | 9/1997 | Takahashi | 24/115 G |
| 6,018,851 A * | 2/2000 | Anscher | 24/115 G |
| D465,408 S * | 11/2002 | Man et al. | D8/395 |
| 6,484,535 B2 * | 11/2002 | Grosser-Samuels | 63/3 |
| D551,067 S * | 9/2007 | Kawamura | D8/383 |
| 7,574,786 B2 * | 8/2009 | Cheng | 24/712.5 |
| 8,181,320 B2 * | 5/2012 | Wolfberg | 24/712.5 |
| 2005/0268436 A1 * | 12/2005 | Yoshiguchi | 24/115 G |
| 2008/0115334 A1 * | 5/2008 | Chen et al. | 24/115 G |
| 2009/0064473 A1 * | 3/2009 | Chan | 24/712.5 |
| 2009/0094798 A1 * | 4/2009 | Yao | 24/115 G |

FOREIGN PATENT DOCUMENTS

| | | |
|---|---|---|
| JP | H05-93224 U | 12/1993 |
| JP | H08-033510 A | 2/1996 |
| JP | H09-294611 A | 11/1997 |
| JP | D1366452 S | 7/2009 |
| JP | 2010-127191 A | 6/2010 |

OTHER PUBLICATIONS

Japan Patent Office, "Office Action for JP 2010-127191," Oct. 8, 2013.

* cited by examiner

CORD LOCK

TECHNICAL FIELD

The present invention relates to an improved cord lock configured to be fastenable to any position of a cord, and to release a fastened state by pressing a male tool into a female tool against a biasing force.

BACKGROUND ART

A conventional cord lock has a male tool and a female tool that receives a part of the male tool by pressing the male tool against a biasing force of a spring, and cord eyelets formed in sides of the male tool and the female tool are matched with each other at a predetermined pressing position of the male tool (Refer to Patent Document 1). In the cord lock described in Patent Document 1, in a state where the male tool is not pressed, a protrusion formed below the eyelet of the male tool hangs on an upper edge of the eyelet of the female tool, thereby preventing the male tool and the female tool from separating from each other even in the case where the cord is not drawn through the cord lock. In the cord lock thus configured, there is a limit to reduce a distance between the eyelet of the male tool and an inner end of the male tool located on a pressed side and therefore, it is difficult to minimize a size of the cord lock in this direction.

PRIOR ART DOCUMENTS

Patent Documents

Patent Document 1: Design Registration No. 1366452

SUMMARY OF THE INVENTION

Problem to be Solved by the Invention

A main object of the present invention is to minimize the size of the cord lock in a pressing direction of the male tool while preventing the main tool and the female tool from separating from each other in spite of the biasing force of a biasing means, which is applied to the cord lock.

Solutions to the Problem

To attain the object, a cord lock according to the present invention is a cord lock having a male tool and a female tool that receives a part of the male tool by pressing the male tool against a biasing force of a biasing means so as to match cord eyelets formed in sides of the male tool and the female tool each other at a predetermined pressing position of the male tool, wherein an engaging part that is engaged with an engaged part of the female tool by the biasing force of the biasing means to prevent the male tool from slipping out of a position before the pressing operation, is formed on a side of the male tool intersecting a direction in which the eyelet passes through, and at a position closer to a pressing backward side than a hole edge located on a pressing forward side of the eyelet.

Since the engaging part is formed on the side of the male tool intersecting the direction in which the eyelet passes through, and at the position closer to the pressing backward side than the hole edge located on the pressing forward side of the eyelet, the size below the eyelet of the male tool can be minimized and therefore, the size of the male tool in the cord lock in the pressing direction can be minimized.

The engaged part of the male tool is a protrusion protruding from a side of the male tool, and a side of the female tool has a communicating part that communicates from an inside to an outside of the female tool, and a part of the side of the female tool located between the communicating part and an upper surface of the female tool on the pressing backward side of the male tool constitutes an elastically deformable engaged part. With such configuration, during insertion of the male tool into the female tool, the engaging part can hit the engaged part, and the male tool can be inserted up to the position where the engaging part enters below the engaged part. As a result, due to elastic return of the engaged part at the position where the engaging part enters below the engaged part, in the state where the male tool is not pressed, the engaging part is engaged with the engaged part by the biasing force of the biasing means, and the male tool and the female tool cannot be separated from each other even in the state where the cord is not drawn through the eyelets.

A sectional outer shape of the male tool in a direction orthogonal to the pressing direction complements an inner shape of the female tool, an outline on one side halved by a virtual straight line passing the center of the male tool constituting the sectional outer shape, and an outline on the other side are symmetrical about the center of the male tool. With such configuration, the male tool can be combined with the female tool only in the state where the side having the eyelets is located on the side having the eyelets of the female tool, and the side having the engaging part is located on the side having the engaged part of the female tool, simplifying assembling of the male tool and the female tool.

Effects of the Invention

In the cord lock according to the present invention, in the state where the cord is not drawn, due to engagement of the engaging part with the engaged part, the male tool and the female tool can be prevented from separating from each other in spite of the biasing force of the biasing means, and the size of the cord lock in the pressing direction of the male tool can be minimized while providing the engaging part.

EMBODIMENT OF THE INVENTION

A typical embodiment of the present invention will be described below with reference to FIG. 1 to FIG. 18. A cord lock R in accordance with this embodiment can be fastened to any position of a cord C, and the fastened state is released by pressing a male tool 1 into a female tool 2 against a biasing force. The cord C may take any shape (round cord, flat cord, etc.) and any material and structure (knitted cord, rubber cord, synthetic resin cord, etc.) as long as the cord lock R can be fastened to the cord C. Typically, the cord lock R is fastened to the cord C in various products, each having a part narrowed or tightened by the cord C, and changes its fastened position to narrow or loosen the part.

Figure 18:
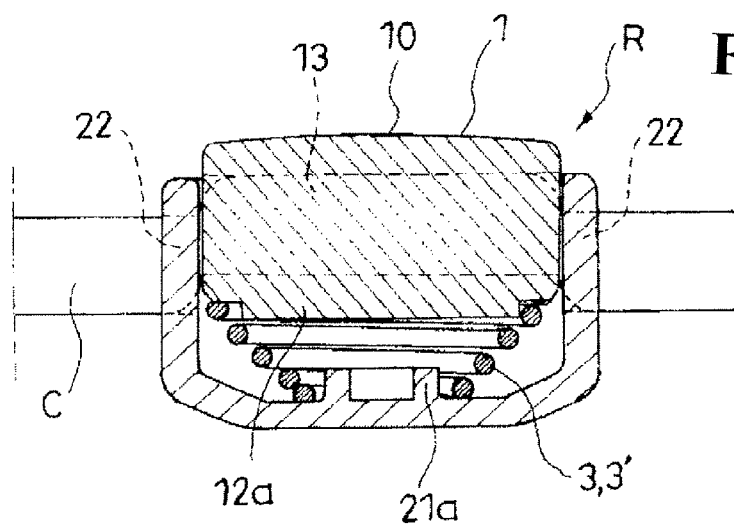
FIG. 18 shows a sectional view showing a state of the cord lock through which a cord is drawn.

The cord lock R has the male tool 1 and the female tool 2 that receives a part of the male tool 1 by pressing the male tool 1 against a biasing force of a biasing means 3, and eyelets 13, 22 for the cord C, which are formed in sides of the male tool 1 and the female tool 2, are matched with each other at a predetermined pressing position of the male tool 1. In such state where the eyelets 13, 22 are matched with each other, the cord C is drawn through the cord lock R, or fastening of the cord lock R to the drawn cord C is released. Then, by stopping the pressing operation of the male tool 1 and moving the male tool 1 toward the position before the pressing operation by the biasing force, the cord C drawn through the eyelets 13 of the male tool 1 and the eyelets 22 of the female tool 2, which are mismatched with each other, is held, and the cord lock R is fastened to the cord C (FIG. 18). In the illustrated example, the two eyelets 13 and the two eyelets 22 are formed in the male tool 1 and the female tool 2, respectively. Thus, in the illustrated example, by drawing the cord C through one of the two eyelets 13 and one of the two eyelets 22, and further drawing the cord C through the other of the two eyelets 13 and the other of the two eyelets 22, the cord lock R can be replaced with a knot of one cord C.

In the illustrated example, the male tool 1 is shaped like a flat plate. A thickness direction of the male tool 1 matches a pressing direction x into the female tool 2. One wide surface of the male tool 1 forms an operational surface 10 for the pressing operation. The eyelets 13 for the cord C are formed on a side 11 of the male tool 1, that is, a portion between the operational surface 10 and a wide other surface 12 of the male tool 1, which is opposed to the operational surface 10. In the illustrated example, both wide surfaces 10, 12 of the male tool 1 each have four corners 14, 14 . . . and accordingly, the side 11 is composed of four side surfaces 11a, 11a . . . . The eyelets 13 for the cord C pass through the male tool 1 over the two side surfaces 11a, 11a located back to back. The two side surfaces 11a, 11a each have the eyelets 13 formed on one side and the other side across a position substantially at the center between the two corners 14, 14 to which the side surfaces 11a abut. The wide other surface 12 of the male tool 1 has a cross-shaped protrusion 12a. In the illustrated example, the protrusion 12a is fitted into a spring upper end 3a of a compression coil spring 3' constituting the below-mentioned biasing means 3, thereby combining the male tool 1 with the spring 3'.

The two side surfaces 11a, 11a among the four side surfaces 11a, 11a . . . of the male tool 1, in which no eyelet 13 is provided, each have an engaging part 15 engaged with an engaged part 25 of the female tool 2 by the biasing force of the biasing means 3 to prevent the male tool 1 from slipping out of the position before the pressing operation. In the illustrated example, the engaging part 15 is provided substantially at the center between the two corners 14, 14 contacting with the side surface 11a in which the engaging part 15 is provided. In the illustrated example, the engaging part 15 of the male tool 1 is provided as a protrusion protruding outward from the side surface 11a of the male tool 1. In the protrusion, a protruding surface located on the side of the operational surface 10 across a top 15a is used as an engaging surface 15b substantially orthogonal to the side surfaces 11a, and a protruding surface located on the opposite side of the engaging surface 15b across the top 15a is used as an inclined surface 15c that comes closer to the operational surface 10 toward the top 15a. The engaging surface 15b of the protrusion is located closer to a pressing backward side Bw than a hole edge 13a of the eyelet 13, which is located on a pressing forward side Fw of the male tool 1.

That is, in this embodiment, the engaging surface 15b as the engaging part 15 is formed on the side 11 intersecting the direction in which the eyelet 13 passes through the male tool 1, and at the position closer to the pressing backward side Bw than the hole edge 13a of the eyelet 13, which is located on the pressing forward side Fw.

The female tool 2 is shaped like a flat box. The thickness direction of the female tool 2 matches the pressing direction x of the male tool 1. A wide upper surface of the female tool 2, which is located on the pressing backward side Bw of the male tool 1, is opened, and the male tool 1 is inserted into the female tool 2 from an opened part 20, that is, from the side opposite to the operational surface 10. The eyelets 22 for the cord C are formed on each side 23 of the female tool 2, that is, between the opened part 20 and a bottom 21. In the illustrated example, the female tool 2 is shaped like a substantially rectangular box, and has four side surfaces 23a, 23a . . . constituting the sides 23. The eyelets 22 for the cord C are formed in the two side surfaces 23a, 23a located back to back so as to communicate the inside to the outside of the female tool 2. The two side surfaces 23a, 23a each have the eyelets 22 on one side and the other side across the center of the side surfaces 23a in the lateral direction. A circling protrusion 21a is formed at the center of the bottom 21 of the female tool 2, and the circling protrusion 21a is fitted into a spring lower end 3b of the compression coil spring 3' constituting the below-mentioned biasing means 3.

Each side 23 of the female tool 2 has a communicating part 24 that communicates from the inside to the outside of the female tool 2, and a part of the side of the female tool 2 located between the communicating part 24 and the upper surface of the female tool 2 constitutes an elastically deformable engaged part 25. The female tool 2 can be formed of a synthetic resin molding to add an elastically deformable property to the engaged part 25. In the illustrated example, the side surfaces 23a among the four side surfaces 23a, 23a . . . constituting the sides 23 of the female tool 2, in which no eyelet 22 is formed, each have the communicating part 24. The communicating part 24 is opened also on the side of the bottom 21. Due to the communicating part 24, edges among edges surrounding the opened part 20 of the female tool 2, which are located on the side surfaces 23a including the communicating part 24, constitute a bridge extending between the two side surfaces 23a, 23a including the eyelet 22, and function as the engaged part 25.

Figure 1:
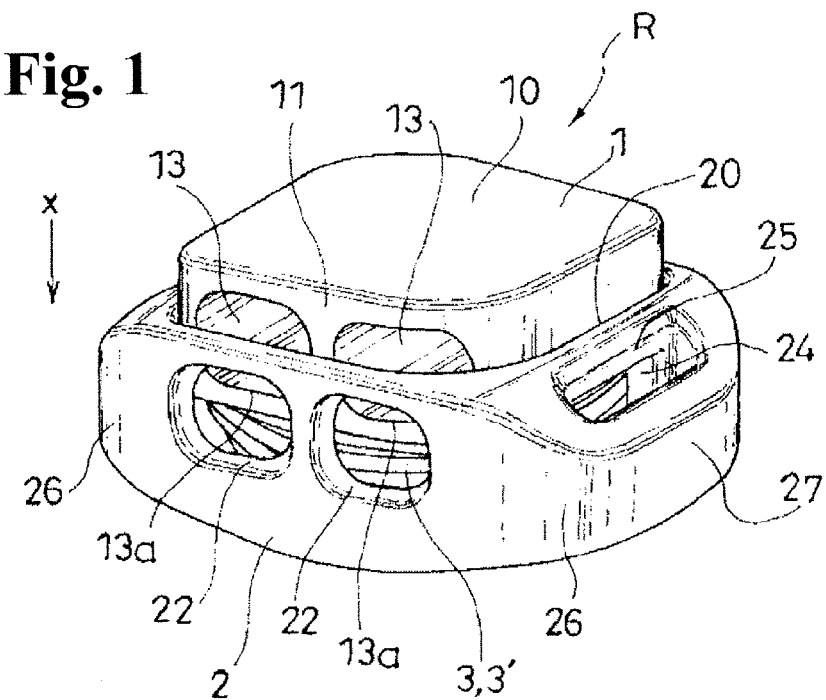
FIG. 1 shows a perspective view of a cord lock in accordance with one embodiment of the present invention.
Figure 2:
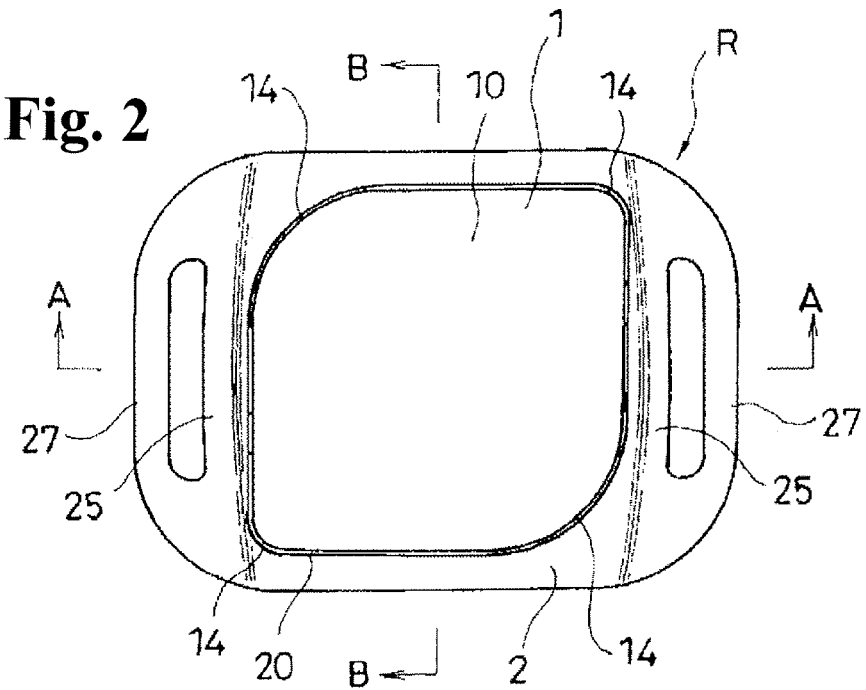
FIG. 2 shows a plan view of the cord lock.
Figure 3:
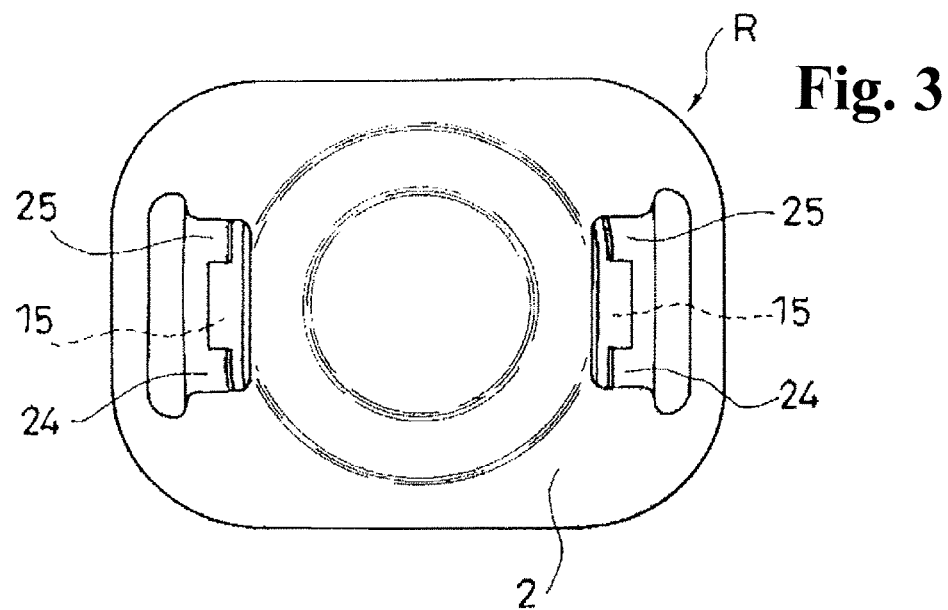
FIG. 3 shows a bottom view of the cord lock.
Figure 4:
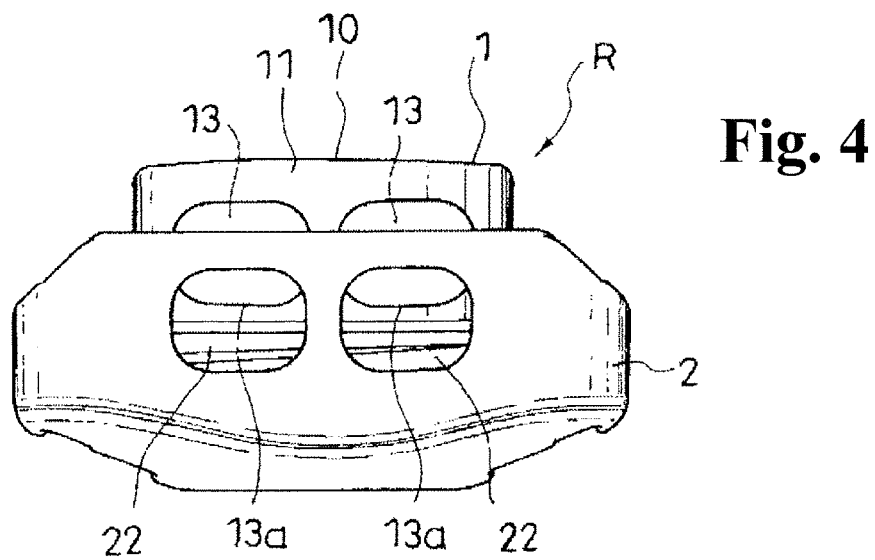
FIG. 4 shows a front view of the cord lock.
Figure 5:
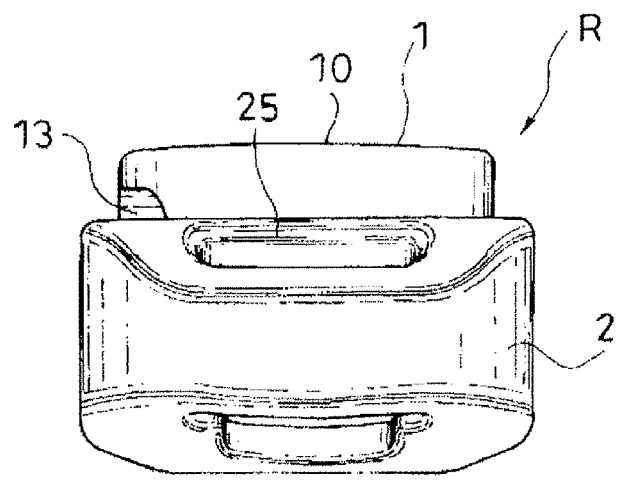
FIG. 5 shows a right side view of the cord lock.
Figure 6:
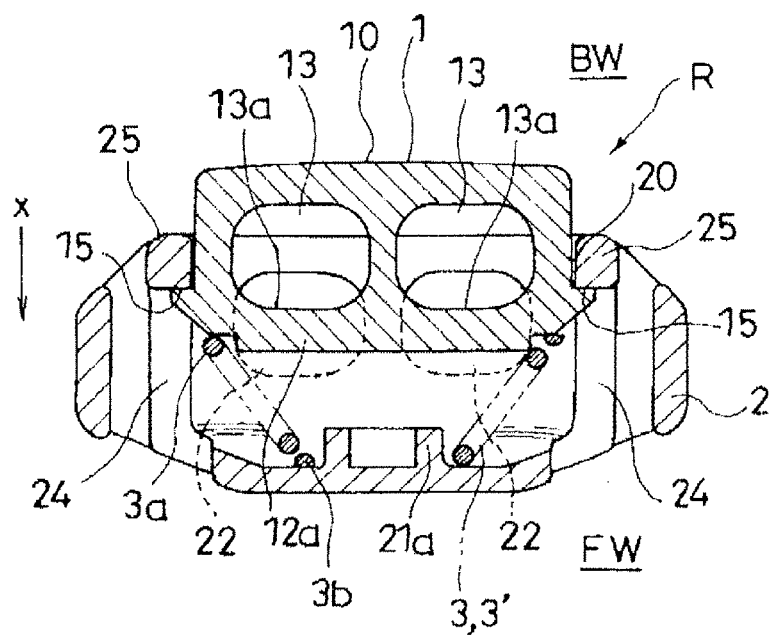
FIG. 6 shows a sectional view taken along a line A-A in FIG. 2.
Figure 7:
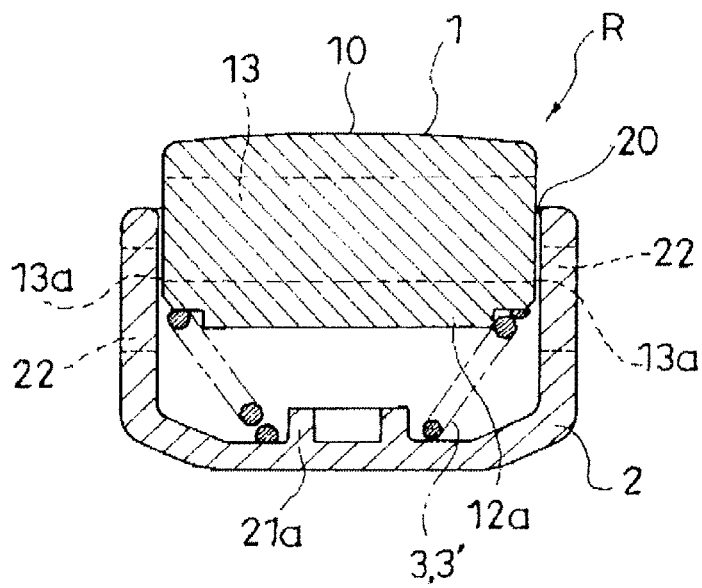
FIG. 7 shows a sectional view taken along a line B-B in FIG. 2.
Figure 8:
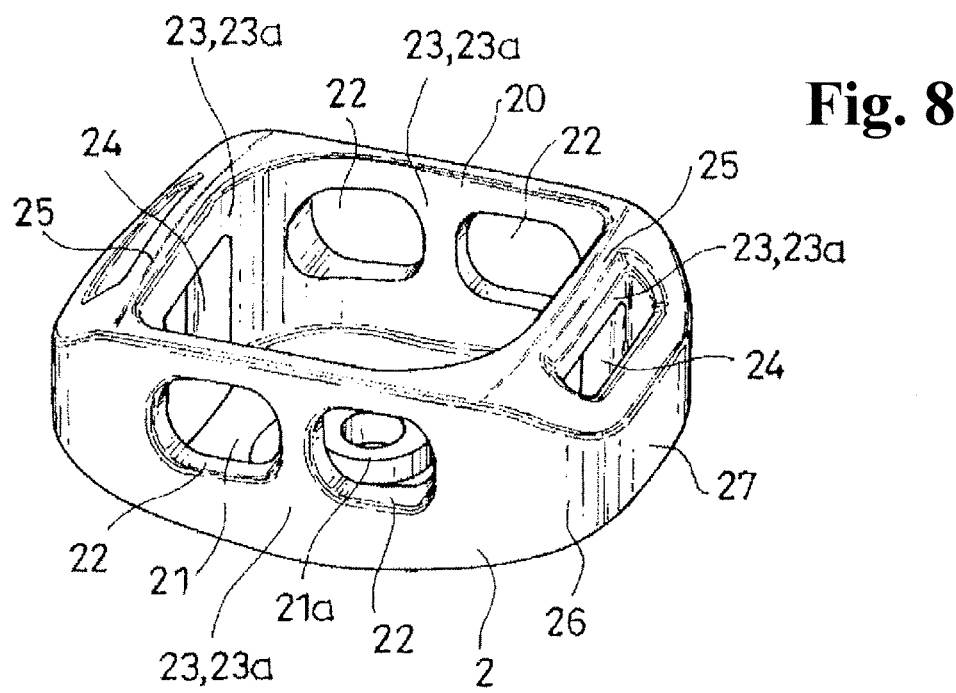
FIG. 8 shows a perspective view of a female tool in accordance with the embodiment of the present invention.
Figure 9:
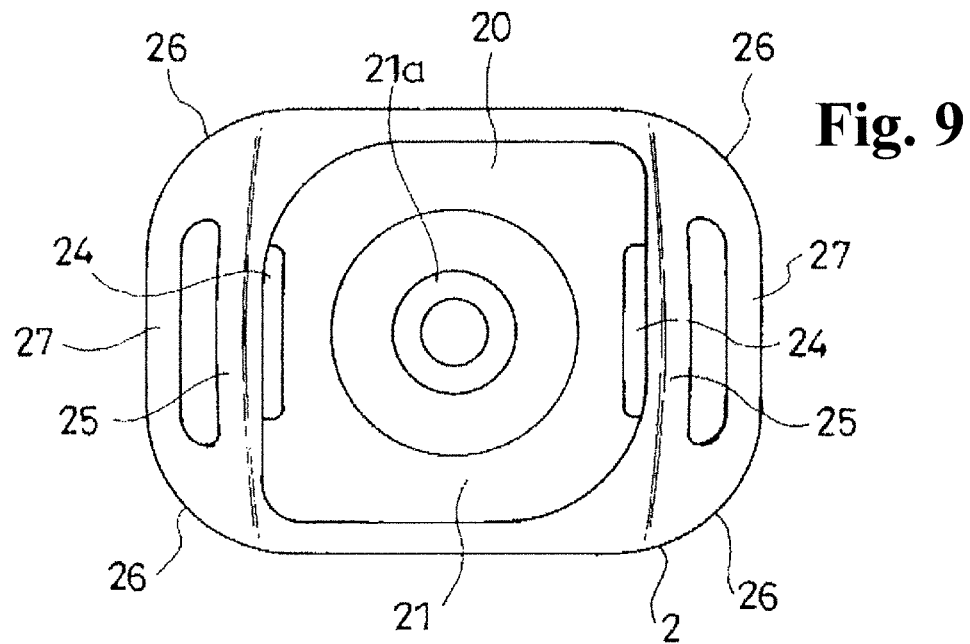
FIG. 9 shows a plan view of the female tool.
Figure 10:
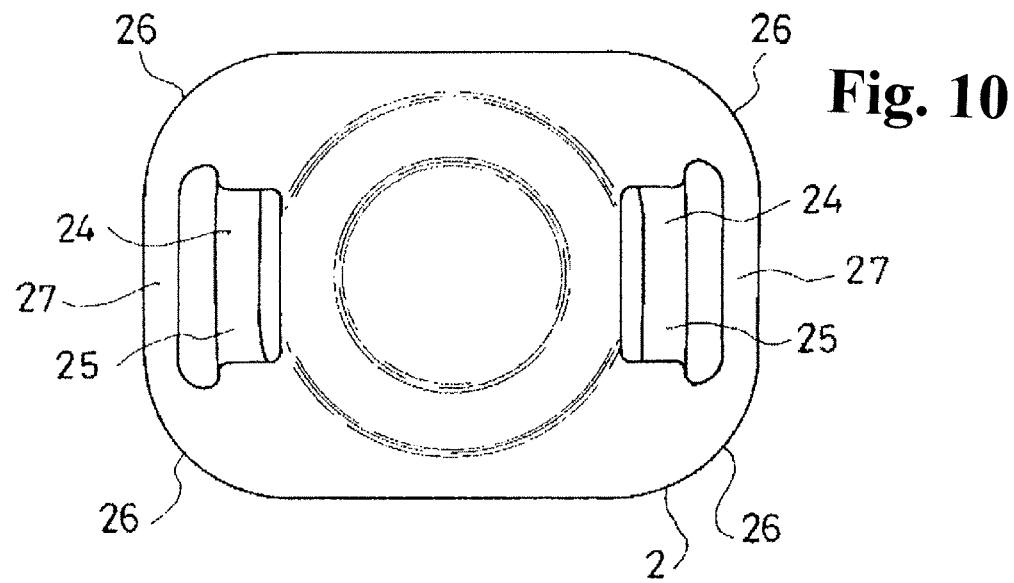
FIG. 10 shows a bottom view of the female tool.
Figure 11:
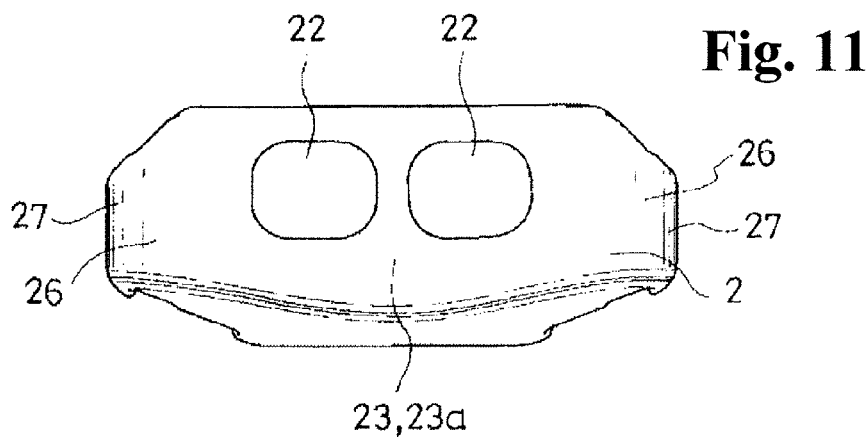
FIG. 11 shows a front view of the female tool.
Figure 12:
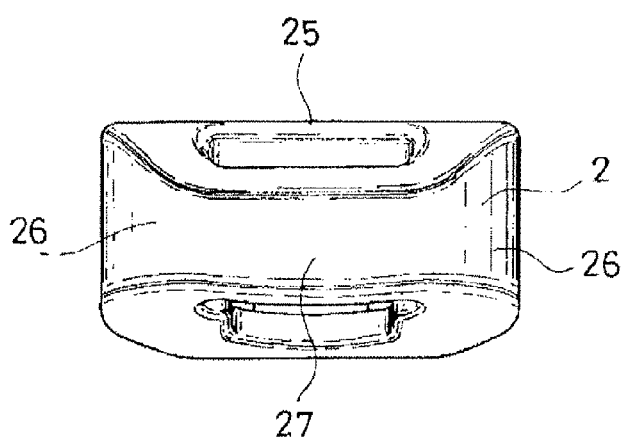
FIG. 12 shows a right side view of the female tool.
Figure 13:
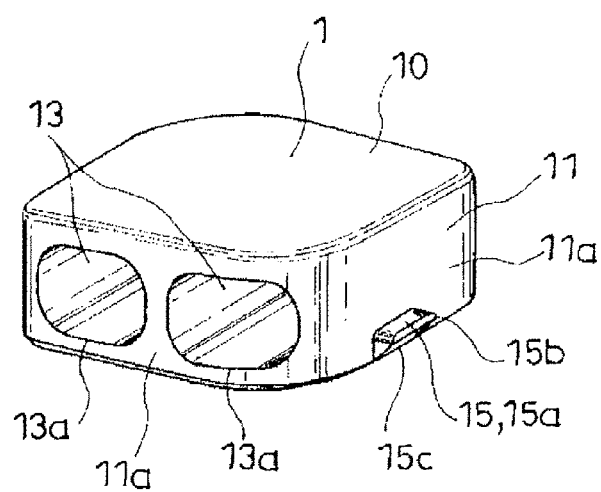
FIG. 13 shows a perspective view of a male tool in accordance with the embodiment of the present invention.

In the illustrated example, the biasing means 3 is formed of the compression coil spring 3' configured to have a smaller spring diameter as it comes closer from the spring upper end 3a to the spring lower end 3b. In the state where the spring lower end 3b of the spring is located on the bottom 21 of the female tool 2 by using the circling protrusion 21a, and the spring upper end 3a of the spring 3' is located on the opposite side of the operational surface 10 of the male tool 1 by using the cross-shaped protrusion 12a, the side opposite to the operational surface 10 of the male tool 1 is inserted into the female tool 2, and during the insertion, the engaging part 15 is engaged with the engaged part 25 to form the cord lock R. In this embodiment, a dimension between the tops 15a of the pair of engaging parts 15, 15 of the male tool 1 is slightly larger than a dimension between the pair of engaged parts 25, 25 of the female tool 2. During the insertion, the inclined surfaces 15c of the engaging parts 15 hit the engaged parts 25 to increase the distance between the pair of engaged part 25, 25, thereby elastically deforming the engaged parts 25. Thereby, the male tool 1 can be inserted up to the position where the top 15a of the engaging part 15 enters below the engaged part 25. When the top 15a of the engaging part 15 enters below the engaged part 25, the engaged part 25 elastically returns. In the state where the male tool 1 is not pressed, due to the biasing force of the biasing means 3, the engaging surface 15b of the engaging part 15 engages with the lower surface of the engaged part 25. As a result, the male tool 1 and the female tool 2 are not separated from each other even in the state where the cord C is not inserted into the eyelets 13, 22. In this state, the operational surface 10 of the male tool 1 protrudes from the opened part 20 of the female tool 2, so that the eyelets 13 of the male tool 1 do not match the eyelets 22 of the female tool 2 (FIG. 1). By pressing the male tool 1 from the state in FIG. 1 up to the position where the eyelets 13 of the male tool 1 match the eyelets 22 of the female tool 2 against the biasing force of the biasing means 3, the cord C can be drawn through the cord lock R, or the fastened state of the cord lock R through which the cord C is drawn can be released.

Since each engaging part 15 is formed on the side 11 intersecting the direction in which the eyelets 13, 22 pass through the male tool 1, and at the position closer to the pressing backward side Bw than the hole edge 13a of the eyelet 13, which is located on the pressing forward side Fw, the size below the eyelet 13 in the male tool 1 can be minimized and therefore, the size of the male tool 1 in the cord lock R in the pressing direction x can be minimized.

Figure 14:
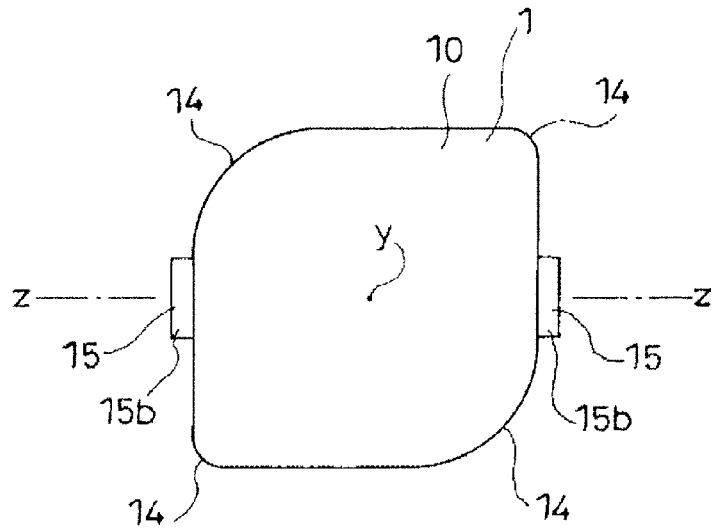
FIG. 14 shows a plan view of the male tool.
Figure 15:
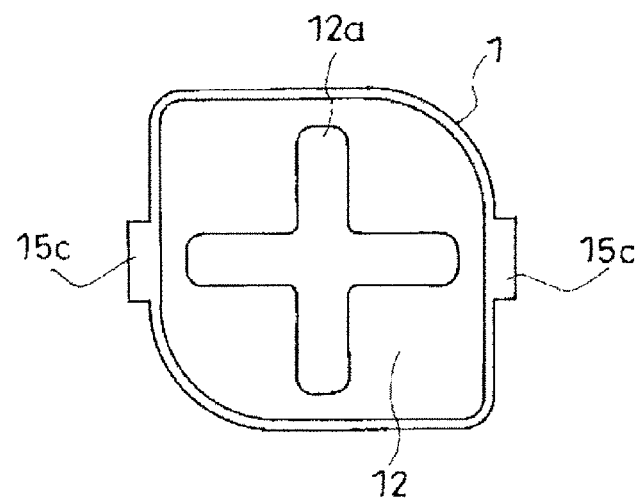
FIG. 15 shows a bottom view of the male tool.
Figure 16:
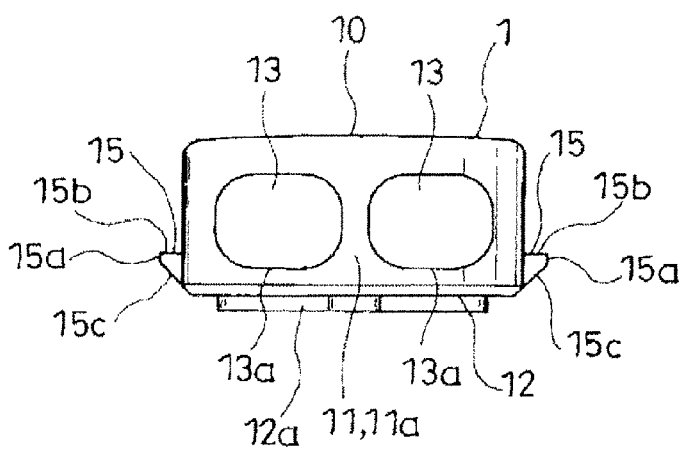
FIG. 16 shows a front view of the male tool.
Figure 17:
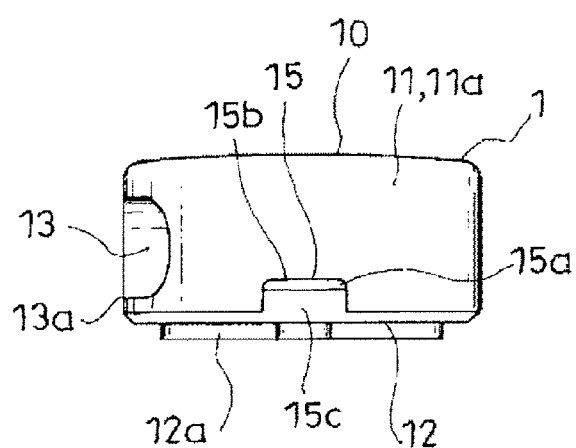
FIG. 17 shows a right side view of the male tool.

In this embodiment, a sectional outer shape of the male tool 1 in a direction orthogonal to the pressing direction x complements an inner shape of the female tool 2, and one outline halved by a virtual straight line z passing the center y of the male tool 1 constituting the sectional outer shape and another outline are symmetrical relative to the center of the male tool 1 (FIG. 14).

In the illustrated example, the two corners 14, 14 among the four corners 14 . . . 14 of the male tool 1, which are located on one diagonal line, not shown in the figures, passing the center y of the male tool 1 each have a small radius, and the two corners 14 located on the other diagonal line, not shown in the figures, passing the center y of the male tool 1 each have a larger radius. Thus, the male tool 1 has the above-mentioned sectional outer shape. An edge of the opened part 20 of the female tool 2 conforms to the sectional outer shape of the male tool 1. Thereby, the male tool 1 can be combined with the female tool 2 only in the state where the side 11 having the eyelets 13 is located on the side of the side 23 having the eyelets 22 of the female tool 2, and the side 11 having the engaging part 15 is located on the side of the side 23 having the engaged part 25 of the female tool 2, simplifying assembling of the male tool 1 and the female tool 2.

In the illustrated example, a band-like hanging part 27 formed of a shoulder part 26 extending from the side surface 23a having the eyelets 22 is provided on the outer side of the side surface 23a of the female tool 2, on which the communicating part 24 is formed.

The whole contents of Specification, Claims, Figures, and Abstract of Japanese Patent Application No. 2010-127191 filed on Jun. 2, 2010 are cited herein, and incorporated as disclosure of Specification of the present invention.

What is claimed is:

1. A cord lock comprising:
a male tool having a male eyelet and engaging parts, each protruding outwardly from a side of the male tool in a direction orthogonal to the male eyelet,
a female tool that receives a part of the male tool, the female tool having first side portions facing each other, second side portions arranged orthogonal to the first side portions and facing each other, engaged parts, each being formed in each of the first side portions, and female eyelets, each being formed in the each of the second side portions to match the male eyelet at a predetermined pressing position of the male tool, and
a biasing device interposed between the male tool and the female tool to bias the male tool outwardly,
wherein the engaging parts are respectively engaged with the engaged parts of the female tool against a biasing force of the biasing device to prevent the male tool from slipping out of a position before a pressing operation, and the biasing device is a compression coil spring having one end with a diameter greater than that of the other end,
each of the first side portions of the female tool has a communicating part separately formed from the female eyelets and communicating from an inside to an outside of the female tool, and
a part of each of the first side portions of the female tool located between the communicating part and an upper surface of the female tool is located on a pressing backward side of the male tool and constitutes an elastically deformable engaged part.

2. The cord lock according to claim 1, wherein the male tool includes a pair of outer side walls through which the male eyelet passes, and another pair of outer side walls arranged perpendicular to the pair of outer side walls and having said engaging parts, the engaging parts being located above a horizontal surface passing through a lower surface of the male eyelet.

3. The cord lock according to claim 2, wherein the upper surface of the female tool includes inclined upper surface portions located on the first side portions, each inclined upper surface portion being inclined downwardly in a direction toward an outer end portion of the first side portion and having said communicating part.

4. A cord lock comprising:
a male tool having a male eyelet and two engaging parts, each being formed at a side where the male eyelet is not formed and protruding outwardly in a direction orthogonal to the male eyelet,
a female tool that receives a part of the male tool, the female tool having two pairs of side portions arranged orthogonal to each other, two engaged parts respectively formed in one pair of side portions facing each other and located at portions closer to a pressing backward side, female eyelets respectively formed in another pair of side portions facing each other to match the male eyelet at a predetermined pressing position of the male tool, and a bottom with a protrusion at a center thereof, and
a biasing device interposed between the male tool and the female tool to bias the male tool outwardly, wherein the two engaging parts are respectively engaged with the two engaged parts of the female tool against a biasing force of the biasing device to prevent the male tool from slipping out of a position before a pressing operation, and the biasing device is a compression coil spring having one end with a diameter greater than that of the other end, the compression coil spring has a conical shape, the one end with the greater diameter being arranged to contact the male tool and the other end of the coil being disposed to surround the protrusion of the bottom, each of the one pair of side portions has a communication part formed separately from the female eyelet at a position where the engaged part is located, the engaging part is located above a horizontal surface passing through a lower surface of the male eyelet, and the upper surface of the female tool includes inclined upper surface portions located on the first side portions, each inclined upper surface portion being inclined downwardly in a direction toward an outer end portion of the first side portion and having said communicating part.

5. The cord lock according to claim 4, the communication part has an edge forming the engaged part.

* * * * *